United States Patent [19]

Kono

[11] 4,278,142

[45] Jul. 14, 1981

[54] AUTOMATIC GUIDANCE SYSTEM FOR VEHICLES

[75] Inventor: Hidehiko Kono, Musashi-Murayama, Japan

[73] Assignees: Agency of Industrial Science and Technology; Ministry of International Trade & Industry, both of Tokyo, Japan

[21] Appl. No.: 20,042

[22] Filed: Mar. 13, 1979

[30] Foreign Application Priority Data

May 8, 1978 [JP] Japan .............................. 53-54194
Sep. 29, 1978 [JP] Japan ............................. 53-120083

[51] Int. Cl.³ .............................................. B62D 1/24
[52] U.S. Cl. .................................. 180/168; 352/132; 358/103; 364/424
[58] Field of Search ............... 180/167, 168, 169, 141, 180/142; 364/424, 436; 354/81; 352/132; 358/101, 103, 106; 340/146.3 AH, 146.3 AC

[56] References Cited

U.S. PATENT DOCUMENTS

| 3,495,677 | 2/1970 | Wilson | 180/168 |
| 3,555,179 | 1/1971 | Rubin | 358/103 X |
| 3,757,887 | 9/1973 | Moore | 180/168 |
| 3,988,535 | 10/1976 | Hickman et al. | 358/101 |
| 4,007,440 | 2/1977 | Kono et al. | 340/146.3 AC |

OTHER PUBLICATIONS

Interplanetary Navigation, IBM Technical Disclosure Bulletin, vol. 4, No. 6, Nov., 1961.

Primary Examiner—David M. Mitchell
Assistant Examiner—D. W. Underwood
Attorney, Agent, or Firm—Oblon, Fisher, Spivak, McClelland & Maier

[57] ABSTRACT

A system for the automatic guidance of a vehicle along a scheduled road route, which comprises marks of varying shapes possessing respectively specific travel-function information and attached to the surface of roads in the route selected for the vehicle's travel and an ITV camera mounted on the vehicle, whereby the automatic guidance of the vehicle's travel is accomplished by causing the ITV camera to photograph successively the marks on the surface of the roads and recognize the shapes of the marks on the basis of the photographed images of the marks, conveying the travel-function information of these marks successively to the automatic steering unit of the vehicle and thereby allowing the vehicle to be accurately steered along the route.

7 Claims, 19 Drawing Figures

Fig. 2
| Mark No. | Shape & Dimension | Surface Area | Mark No. | Shape & Dimension | Surface Area |
|---|---|---|---|---|---|
| No.1 | 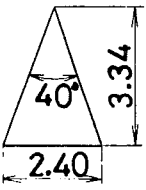 40°, 3.34, 2.40 | 4 | No.6 | 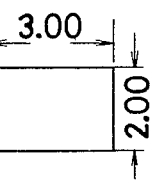 0.98 | 3 |
| No.2 |  0.56 | 1 | No.7 | 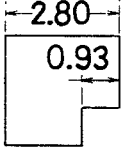 2.00, 1.00 | 2 |
| No.3 | 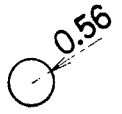 3.00, 1.00 | 8 | No.8 | 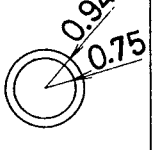 3.00, 2.00 | 6 |
| No.4 | 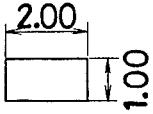 2.80, 0.93 | 7 | No.9 | 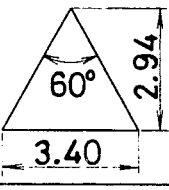 0.94, 0.75 | 1 |
| No.5 | 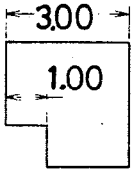 60°, 2.94, 3.40 | 5 | No.10 | 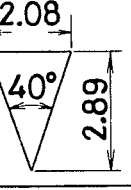 2.08, 40°, 2.89 | 3 |

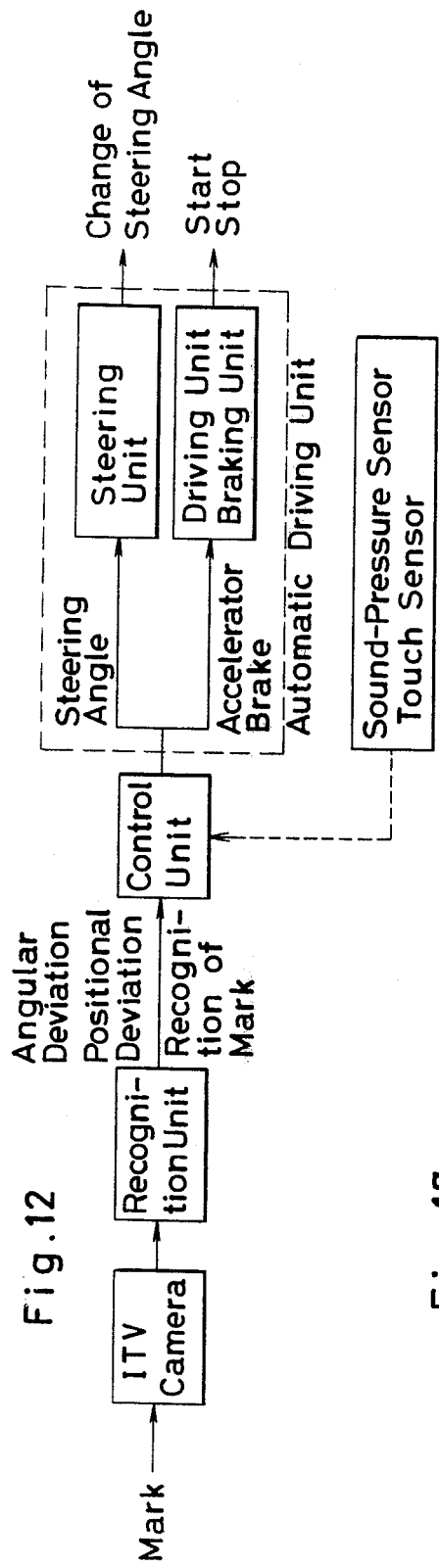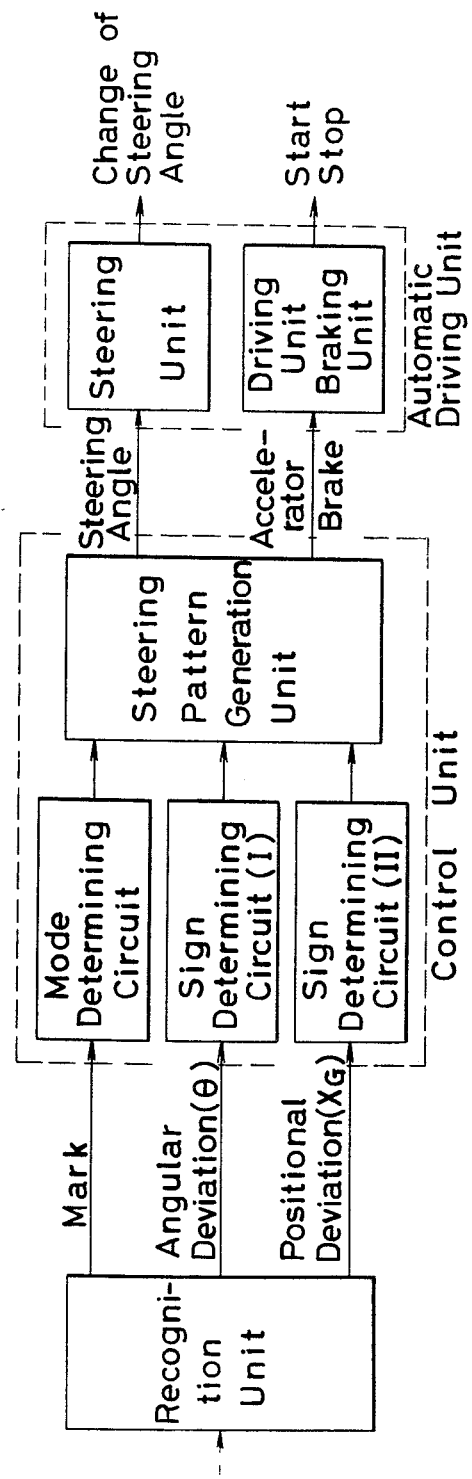

Fig.13(A)
Fig.13(B)
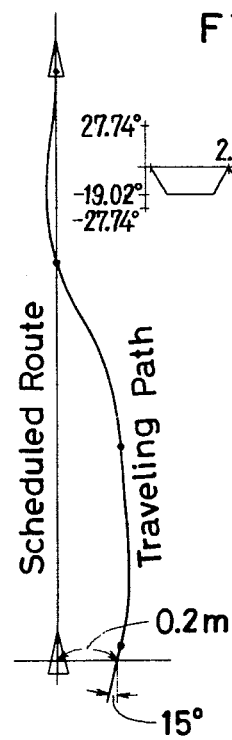
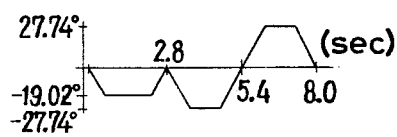
Fig.14(A)
Fig.14(B)
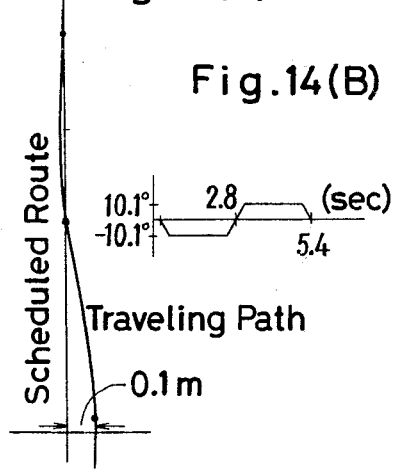
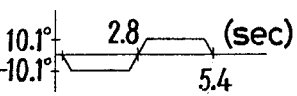
Fig.15(A)
Fig.15(B)
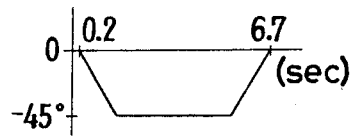
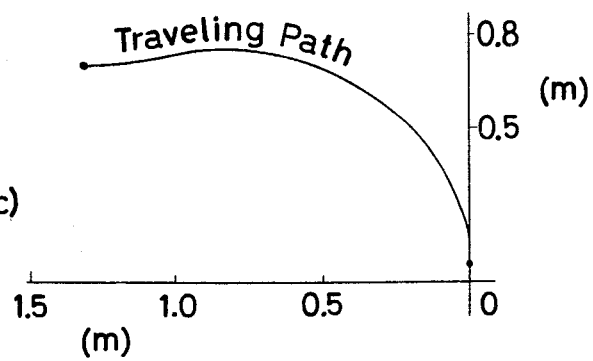

AUTOMATIC GUIDANCE SYSTEM FOR VEHICLES

BACKGROUND OF THE INVENTION

This invention relates to an automatic guidance system for vehicles, and more particularly to an automatic guidance system for vehicles to be used, for example, in the automatic guidance of vehicles carrying various articles, wheeled beds and chairs carrying invalids and vehicles loaded with monitor systems for detection of abnormal phenomena within an atomic furnace.

For automatic guidance of vehicles, there has already been suggested a method for application to a system involving a network of roads, a fleet of vehicles, guide cables each adapted to generate an electromagnetic field of low frequency and buried one each under the surface of roads along the routes in the network of roads and laterally opposed pairs of pickup coils disposed one each on the vehicles and adapted to detect the aforementioned electromagnetic fields, which method comprises causing a given vehicle to travel along a selected route by causing the opposed pair of pickup coils on the vehicle to detect the electromagnetic field being generated by the guide cable buried under the surface of the road on which the vehicle is in motion, comparing the electric potentials induced consequently in the opposed pair of pickup coils, and allowing the vehicle to be accurately steered along the route by having the operation of a steering motor controlled in such a way as to reduce to zero the difference between the two potentials under comparison. There has also been proposed a system similar to that described above except that metallic tapes are attached to the surface of roads to take the place of buried guide cables and a plurality of photo-sensors disposed on each vehicle in one straight line perpendicular to the direction of the vehicle's travel take the place of the pair of pickup coils. In this system, a vehicle is made to travel along a selected route by causing the array of photo-sensors on the vehicle to detect the electric field being generated by the metallic tape on the road surface and allowing the vehicle to be accurately steered along the route by having the operation of the steering motor thereof controlled in such a way as to eliminate the positional deviation of the vehicle determined in consequence of the aforementioned detection of the electric field by the photo-sensors.

These methods require installation of guide cables or metallic tapes in continuous lines and the installation of such cables or tapes is expensive and time consuming. Once such cables or tapes have been laid, route changes cannot easily be made.

An object of the present invention is to provide an automatic guidance system for vehicles, which permits the travel routes to be easily established and altered.

Another object of this invention is to provide an automatic guidance system for vehicles, which enables vehicles to be accurately guided to their destinations.

A further object of this invention is to provide an automatic guidance system for vehicles, which enables vehicles to be guided faithfully along their respectively selected routes.

Yet another object of the present invention is to provide an automatic guidance system for vehicles, which enjoys ease of operation and provides safe travel of vehicles.

SUMMARY OF THE INVENTION

To accomplish the objects described above according to the present invention, there is provided an automatic guidance system for vehicles using marks of varying shapes each possessing specific travel-function information and attached to the surface of roads along a route selected for the travel of the vehicle, an ITV camera mounted on the vehicle and adapted to photograph successively the marks on the surface of roads and a unit capable of recognizing the shapes of the mark images photographed by the aforementioned ITV camera and conveying the travel-function information of the marks to the automatic steering unit of the vehicle for thereby allowing the vehicle to be accurately steered along the scheduled route, which system is operated by a procedure which comprises causing the marks possessing respective directionally to be photographed through the ITV camera on the image recognition unit of the camera, determining the positional deviation of the vehicle from the scheduled route of the vehicle's travel through the measurement of the position of the center of the photographed image of the mark formed as described above, determining the postural angle of the mark photographed in terms of the radio between the width $A_p$ from the point on the X axis at which the pattern of the aforementioned mark projected on the X axis in the Cartesian coordinate system has the largest height $A_y$ to the point on the X axis at which the aforementioned projecte pattern has the smallest value and the largest width $A_x$ of the aforementioned projected pattern in the direction of the X axis, conveying the value of positional deviation determined as described above and the ratio to the postural angle to the control unit of the automatic steering unit, and causing the automatic steering unit to control the operation of the steering wheel in accordance with the various forms of information obtained as described above so as to steer the vehicle accurately along the stated route. The recognition of a given mark is effected by means of a pattern-classification value which is determined by the pattern-classification value of that mark which is automatically obtained by measuring the largest width, the largest height and the area of the shape of the image of the mark photographed by the ITV camera and calculating the ratio between the product of the largest width multiplied by the largest height and the area. The travel-function information obtained in consequence of the recognition of a mark is conveyed to an automatic steering unit of the vehicle, wherein the information is handled and analyzed as data indicative of values of positional deviation and angular deviation of the vehicle relative to the route of its travel. The automated guidance of the vehicle is effected using the result of this analysis. When the vehicle has mounted thereon a memory unit to which a number of steering modes are taught in advance so that the vehicle can be operated in the optimum steering mode selected for the occasion in accordance with the recognition of the mark, then the control of the automatic steering of the vehicle are notably simplified.

The other objects and characteristic features of the present invention will become apparent from a detailed description of the invention to be given hereinafter with reference to the accompanying drawing.

BRIEF EXPLANATION OF THE DRAWING

FIG. 2 is an explanatory diagram showing typical examples of the shapes of marks to be applied to the surface of roads for the automatic guidance of vehicles by the system of this invention.

FIG. 12 is a block diagram showing a typical series of control steps starting with the recognition of the mark and terminating with automatic steering of a vehicle in the automatic guidance system for vehicles of this invention.

FIG. 13 is an explanatory diagram showing the path of travel of a vehicle and the angles of steering required for the correction of postural angles and positional deviations of the vehicle in the automatic guidance system for vehicles of this invention.

FIG. 14 is an explanatory diagram showing the path of travel of a vehicle and the angles of steering required for the correction of only positional deviations of the vehicle in the automatic guidance system for vehicles of this invention.

FIG. 15 is an explanatory diagram showing the path of travel of a vehicle and the angles of steering involved in a left turn of the vehicle.

FIG. 17 is an explanatory diagram of another series of control steps starting with the recognition of the mark and terminating with automatic steering of a vehicle in the automatic guidance system for vehicles of the present invention.

DESCRIPTION OF THE PREFERRED EMBODIMENT

Figure 1:
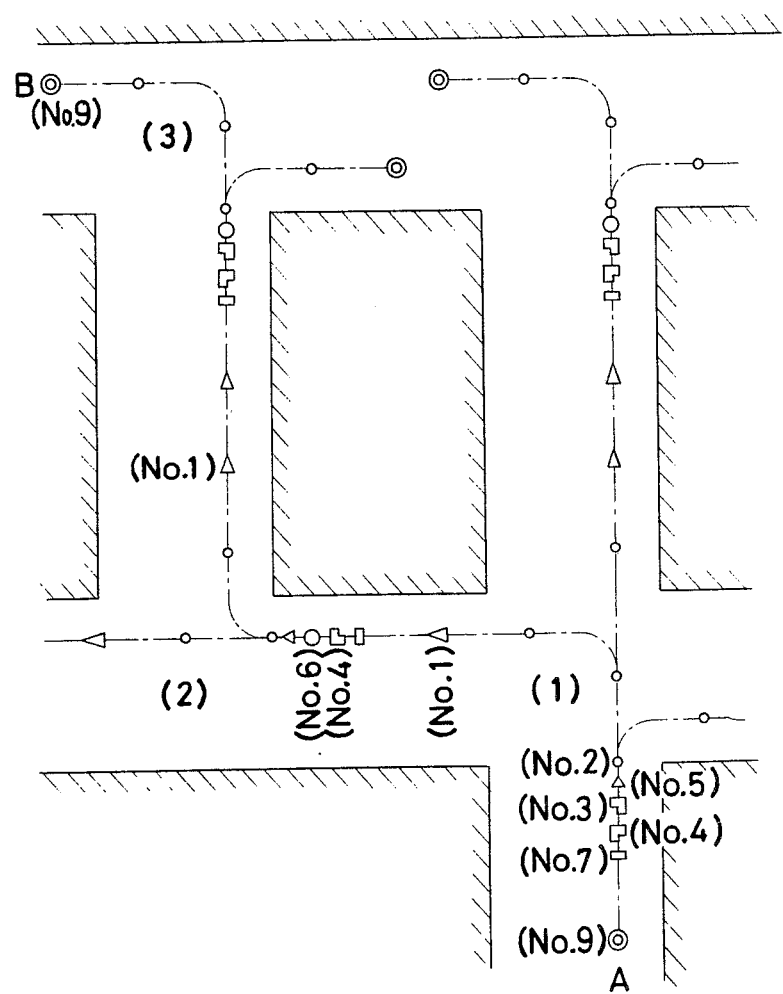
FIG. 1 is an explanatory diagram showing an area of roads having marks used for automatic guidance of vehicles by the system of this invention.

The system of the present invention for the automatic guidance of vehicles essentially involves a network of roads, a vehicle, marks of varying shapes representing specific functional data such as those designating straight travel, stop of travel, left turn and right turn (as illustrated in FIG. 2) and attached at points along selected routes in the network of roads as shown in FIG. 1 and ITV cameras installed one each on the vehicles. This system operates on a procedure which comprises causing the ITV camera mounted on a given vehicle in operation along a given route to photograph successively the marks attached to the surface of the roads along the route, causing a pattern recognition unit also mounted on the vehicle to recognize the shapes and sizes of the photographed images of the marks and consequently determine the functional data of the marks and causing the vehicle to be accurately steered along the route by enabling the steering motor of the vehicle to be controlled on the basis of the functional data.

Generally for a vehicle to start from its origin and reach a desired destination, many drive functions are involved. In the present embodiment, the automatic guidance of vehicle travel is presumed to be effected by use of a total of ten marks as shown in FIG. 2. Now, these marks will be described below.

No. 1—Straight travel I

This mark designates a travel of the vehicle on a straight road or smoothly curved road. It causes necessary corrections of the vehicle's postural angles and positional deviations to ensure the vehicle's smooth travel along the pre-selected route. This mark, therefore, is desired to be of a shape which warrants accurate measurement of the postural angle.

No. 2—Straight travel II

When a vehicle is traveling along a straight road with a flat, smooth surface, the vehicle's posture is not considered to vary to any appreciable extent. This mark, therefore, designates straight travel of the vehicle involving solely corrections of positional deviations.

No. 3—Left turn

This mark designates a left turn of the vehicle at an intersectional place. It involves no corrections in the postural angles and positonal deviations of the vehicle.

No. 4—Right turn

Similarly to the mark of No. 3, this mark designates a right turn of the vehicle at an intersectional place.

No. 5—Straight travel III

This mark designates straight travel of the vehicle across an intersectional place, without involving any corrections in the postural angles and positional deviations of the vehicle.

No. 6—Dummy

This mark designates the type of intersection, i.e. it indicates the intersection to be a crossroads (+), a T intersection (T) or an L intersection (L), without involving any corrections in the postural angles and positional deviations of the vehicle.

No. 7—Temporary stop I

This mark is positioned immediately in front of an intersection to designate a temporary stop of the vehicle, enabling the vehicle to be ready for detection of the GO or STOP signal of the traffic lights at the intersection. In this case, the mark causes corrections of only positional deviations of the vehicle.

No. 8—Temporary stop II

This mark designates a temporary stop of the vehicle on a part of the road other than an intersection. It similarly causes corrections of only positional deviations of the vehicle.

No. 9—Destination or origin

This mark designates the destination of the vehicle. On recognition of this mark, the vehicle senses the termination of its travel and comes to a stop. When the same vehicle is started from this position, the same mark serves to designate the origin of the vehicle's travel. In this case, the mark causes corrections of only positional deviations.

No. 10—Rearward travel

This mark designates rearward travel of the vehicle, involving corrections only in the postural angles.

The shapes of the marks shown in FIG. 2 are purely examples. In the actual selection of such shapes of marks, essential criteria that the shapes of marks should enjoy simplicity and distinctiveness, permit easy recognition, allow accurate discernment of necessary information, and enable people in general to interpret readily the meanings of such marks to permit their acceptance in human environments must be taken into full consideration.

These marks are made of plastic film, for example. They are applied fast to the road surfaces in accordance with set rules: Marks for straight travel are arranged at intervals of not more than two meters. In front of an intersection, a mark for intersection (No. 7), a mark for right turn (No. 4), a mark for left turn (No. 3), a mark for straight travel (No. 5) and a mark for straight travel (No. 2) are arranged at intervals of 0.5 meter.

The numerals of the dimensions of marks indicated in FIG. 2 do not represent absolute values but relative values of all the marks involved, and those of the relative surface areas represent relative areas with the area of the mark of No. 2 taken as unity "1". Actually, the surface areas of these marks are sufficient in the range of from 10 to 80 cm$^2$.

After the marks have been applied as required to the road surface, a vehicle to be used in the service within the network of roads is located at or near origin. The vehicles to which the system of this invention can be applied include vehicles for carrying articles, wheeled beds and chairs for carrying invalids and vehicles loaded with monitor systems such as those cyclically operated within hazardous zones of an atomic reactor, for example. Each of the vehicles thus put to use by the method of this invention is provided with an automatic steering unit, a micro-computer and an ITV camera for photographing the marks on the roads. It is advantageous for the lens plane of the ITV camera to be fixed so that the road surface is shot at in a perpendicular direction from the center of the vehicle to ensure accurate recognition of the marks.

Now, the operation of this invention will be described with reference to the travel of a vehicle from the origin "A" to the destination "B" in the area of roads indicated in FIG. 1. Prior to the start of travel, the memory unit of the microcomputer mounted on the vehicle located at the point "A" is caused to store therein an instruction to select and detect sequentially the marks No. 9, No. 3, No. 4, No. 3 and No. 9. Further in this memory unit, there is stored in advance the information concerning the selection of signals to be forwarded to the automatic steering unit upon recognition of marks. The microcomputer, therefore, conveys sequentially to the automatic steering unit the signals corresponding to the marks recognized by the pattern recognition unit, causing the vehicle to start travel, continue along a straight travel, make a left turn, make a temporary stop, etc. In accordance with the aforementioned stored instruction, the vehicle first detects the mark of No. 9 to confirm that it now stands at the origin "A" and then gives to the automatic steering unit a signal to start travel. Since, the vehicle is adapted so that it will not start any new action until it recognizes the relevant mark, there is no need of taking the trouble to bring the vehicle very accurately on the mark.

The recognition of a mark photographed on the ITV camera is based on the pattern-classification value and the surface area value of the photographed image of the mark. The pattern-classification value S is disclosed in detail in U.S. Pat. No. 4,007,440. It is described below with reference to FIG. 3.

Figure 3A:
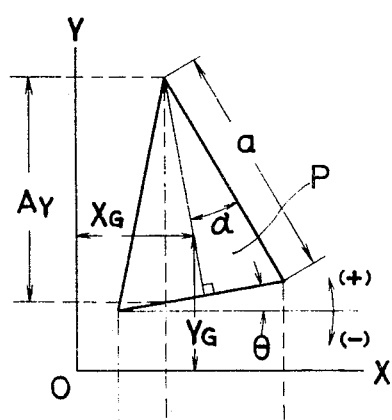
FIG. 3(A) is an explanatory diagram showing the manner in which a mark is photographed on the ITV camera mounted on a vehicle.
Figure 3B:
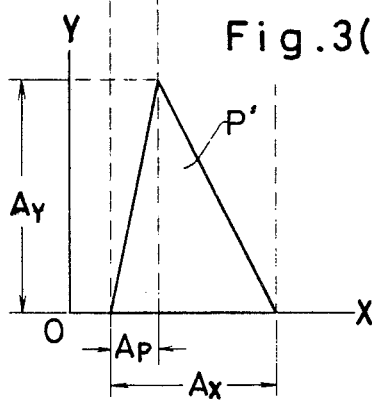
FIG. 3 (B) is an explanatory diagram showing the relation between the image of the mark photographed and the projective pattern of the photographed image.

It is assumed by way of example that the mark of No. 1 is photographed at a postural angle $\theta$ by the ITV camera. On the Cartesian coordinate system, the plan-view pattern P of the photographed image of the mark is represented as shown in FIG. 3(A) and the projective pattern P' is represented as shown in FIG. 3(B) respectively. The ratio of the area Aa of the pattern P (P') and the product of the largest width Ax multiplied by the largest height Ay of the pattern is defined as the "pattern-classification value S".

$$S = \frac{Aa}{Ax \times Ay} \tag{1}$$

Generally, the pattern-classification value S varies with the postural angle $\theta$ and therefore forms a function of $\theta$. The range in which the pattern-classification value S is variable is as follows.

$$0.0 \leq S \leq 1.0 \tag{2}$$

Now, the calculation of the pattern-classification value S will be tried in accordance with FORMULA (1) with reference to a simple pattern, by way of example.

In the case of the pattern of a triangle, the pattern-classification value of the following equation is satisfied at any desired postural angle as is clear from FIG. 3(B).

$$Aa = \frac{Ax \times Ay}{2} \quad (3)$$

Consequently, the pattern-classification value S is found, as indicated by the following equation, to be 0.5, a value which is invariable with the postural angle.

$$S = \frac{Ax \times Ay}{2(Ax \times Ay)} = 0.5 \quad (4)$$

In the case of the pattern of a circle or a perforated circle, the pattern-classification value has no bearing upon the postural angle. In the case of a perforated circle wherein the radius of the outer circle and that of the inner circle are represented respectively by $r_1$ and $r_2$, the pattern-classification value S is calculated as follows:

$$\left. \begin{array}{l} Ax = 2r_1 \\ Ay = 2\sqrt{r_1^2 - r_2^2} \\ Aa = \pi(r_1^2 - r_2^2) \end{array} \right\} \quad (5)$$

$$S = \frac{\pi \sqrt{r_1^2 - r_2^2}}{4r_1} = \frac{\pi}{4}\sqrt{1 - \left(\frac{r_2}{r_1}\right)^2}$$

Thus, it is found that the pattern-classification value S of the perforated circle is determined by the ratio between the radius of the outer circle and that of the inner circle. In the case of the pattern of an unperforated circle, since $r_2 = 0$, the pattern-classification value S is found as follows.

$$S = (\pi/4) \approx 0.785 \quad (6)$$

Figure 4A:
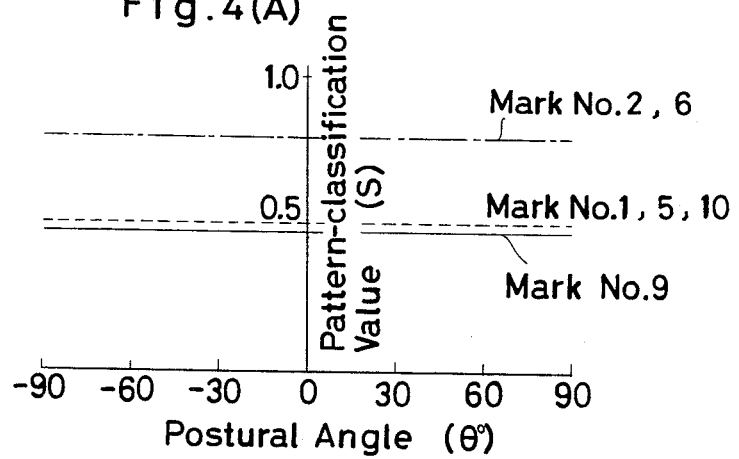
FIG. 4 is an explanatory diagram showing the relation between the mark of FIG. 2 and the pattern-classification value.
Figure 4B:
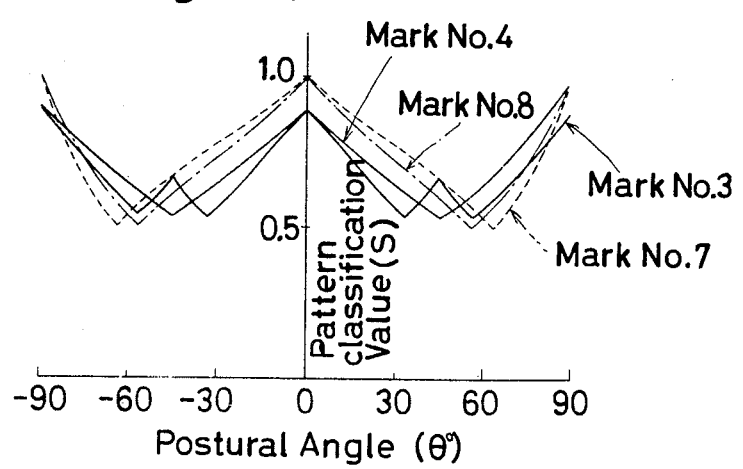

The pattern-classification values of the triangles of the marks Nos. 1, 5 and 10, the circles of the marks of Nos. 2 and 6 and the perforated circles of the marks of Nos. 7 and 8 are shown in FIG. 4(A) and those of the rectangles of the marks of Nos. 7 and 8 and the L-shaped patterns of the marks of Nos. 3 and 4 are shown in FIG. 4(B).

Through the measurement of the pattern-classification values described above, the shapes of marks photographed by the ITV camera are recognized. Through the measurements of the specific surface areas of marks, the identities of marks are confirmed. In this manner, the functional significances assigned to the marks are discerned and the signals corresponding to the information are supplied to the steering unit, causing the vehicle to travel straight, turn right, turn left, stop temporarily, etc.

To be more specific with reference to FIG. 1, after the vehicle has detected the mark of No. 9 and has therefore confirmed its current position to be the origin of its travel, it starts straight travel. As it approaches the intersection (1), it detects the mark "intersection" of No. 7.

Upon detection of this mark of No. 7, the memory unit converts the signal for the automatic steering unit into a traffic signal detection mode, with the result that the vehicle is immediately brought to a stop. The vehicle resumes its travel after it has detected a GO signal issued such as in the form of a frequency signal by the traffic signal unit at the intersection. It then proceeds to detect the mark of No. 3 as the second of the series of marks stored in the memory unit. The detection of this mark of No. 3 implies a confirmation that the vehicle is permitted to make a left turn at the first intersection (1). If this mark of No. 3 is not detected, the absence of the detection is interpreted as an indication of trouble of some form or other, with the vehicle brought to an emergency stop. The vehicle which has detected the mark of No. 3 continues its travel and, at the same time, it is caused by the mark of No. 2 to make corrections in its positional deviations. At the time that the second mark of No. 2 is detected, the vehicle makes a left turn of travel. Thereafter, the vehicle proceeds straight while it is caused by the mark of No. 2 to make corrections in the positional deviations and by the mark of No. 1 to make corrections in the postural angles and positional deviations. The corrections which the vehicle makes in its postural angles and positional deviations in accordance with the functional information of the marks will be described later.

At the second intersection (2), the vehicle makes a right turn upon detection of the mark of No. 4 in much the same way as described above. At this particular intersection, since a left turn is physically impossible, the mark of No. 6 is attached to the road surface in place of the mark of No. 3. In a similar manner, the vehicle makes a left turn at the third intersection (3) and comes to a stop at the destination "B" after detecting the mark of No. 9.

Figure 5:
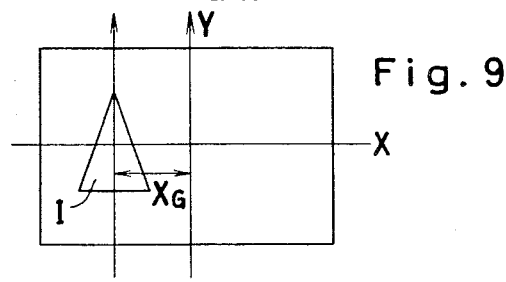
FIG. 5 is an explanatory diagram showing the travel of a vehicle along paths deviating from the scheduled route of travel.
Figure 6:
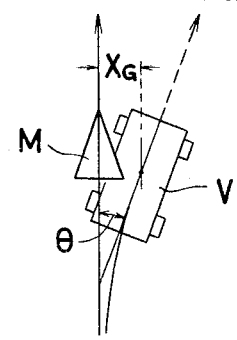
FIG. 6 is an explanatory diagram of the mark image photographed by the ITV camera mounted on the vehicle when the vehicle assumes the position shown in FIG. 5.

As described above, the vehicle is accurately steered along the scheduled route as the marks attached to the road surface are successively recognized by the ITV camera mounted on the vehicle and the corresponding functional travel information is delivered to the automatic steering unit. If the vehicle V happens to travel with the angular deviation $\theta$ and a positional deviation $X_G$ relative to the scheduled route as shown in FIG. 5, the mark M on the road surface forms an image I in the visual field of the ITV camera as shown in FIG. 6. The angular deviation of the vehicle can be determined from the photographed image I by measuring the postural angle $\theta$ of this image I. So, the postural angle $\theta$ of the photographed image of the mark is measured by a method indicated below and the angle thus measured is used as the angular information of the vehicle relative to the scheduled route.

As the parameter for the detection of the postural angle of the photographed image I of the mark, there is used what is called the angle detection value. This angle detection value "Q" may be defined as follows.

It is now assumed by way of example that a plan-view pattern P occurs at a given postural angle $\theta$ in a fixed Cartesian coordinate system as shown in FIG. 3(A). Here, the postural angle $\theta$ is assumed to be such that it makes a positive rotation in the counterclockwise direction and a negative rotation in the clockwise direction. Now, the aforementioned plan-view pattern P formed in the Cartesian coordinate system of FIG. 3(A) is projected on the X axis. Consequently, there is formed a projective pattern P' as shown in FIG. 3(B). In this projective pattern P', the maximum width of the pattern in the direction of the X axis is to be represented by Ax and the distance between the point on the X axis at which the projective pattern P' has the largest height in the direction of the Y axis and the smallest value which the projective pattern P' has on the X axis is to be represented by Ap. Then, the ratio of Ax to Ap is the angle detection value Q which is used as the parameter for the measurement of the postural angle.

$$Q = (Ap/Ax) \quad (7)$$

As is evident from the foregoing formula (7), the range in which the angle detection value is variable is indicated by the following formula:

$$0.0 \leq Q \leq 1.0 \quad (8)$$

Now, the calculation of the angle detection value according to the formula (7) will be tried with reference to a simple pattern by way of example.

In the case of an isosceles triangle which has two equal sides of a length "a" and a vertical angle of $2\alpha$ as shown in FIG. 3(A), the following equations are satisfied on the conditions indicated respectively.

(1) Where $|\theta| \leq \alpha$, $$\begin{aligned} Ax &= 2a \sin \alpha \cos \theta \\ Ap &= a \sin (\alpha - \theta) \\ Q &= (1 - \cot \alpha \tan \theta)/2 \end{aligned} \quad (9)$$

(2) Where $\alpha \leq \theta \leq 90°$, $$\begin{aligned} Ax &= a \sin (\theta + \alpha) \\ Ap &= a \sin (\theta - \alpha) \\ Q &= \frac{\sin (\theta - \alpha)}{\sin (\theta + \alpha)} \end{aligned} \quad (10)$$

(3) Where $-90° \leq \theta \leq -\alpha$, $$\begin{aligned} Ax &= a \sin (\alpha - \theta) \\ Ap &= 2a \sin \alpha \cos \theta \\ Q &= 1 - \frac{\sin (\theta + \alpha)}{\sin (\theta - \alpha)} \end{aligned} \quad (11)$$

Figure 7:
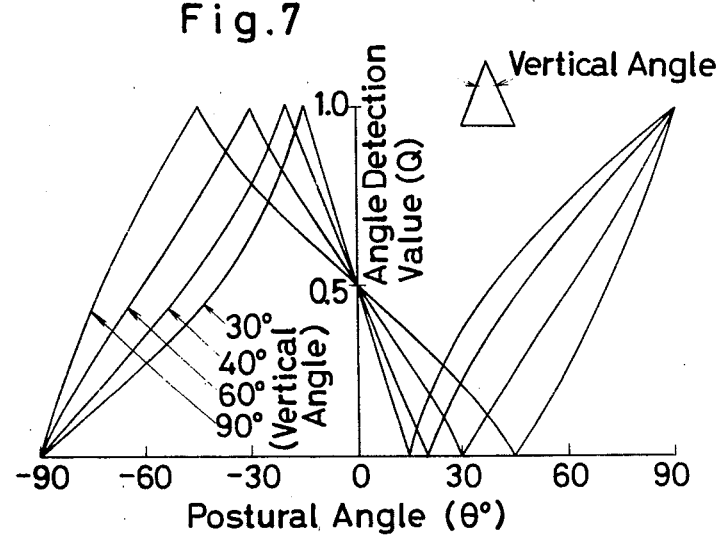
FIG. 7 is a graph showing the angle detection values of isosceles triangles having vertical angles of 30, 40, 60 and 90 degrees.

The results of the calculations carried out in accordance with the formulas (9) through (11) are shown in FIG. 7.

It is evident from FIG. 7, which shows typical angle detection values, that the angle detection value corresponds, in principle, to the postural angle $\theta$ in a fixed range centering at $\theta = 0$, indicating that the postural angle $\theta$, of the pattern can be determined by the measurement of the aforementioned angle detection value. When the postural angle exceeds the fixed range such as, for example, the range of $\pm 20°$ in the case of a $= 40°$ of the pattern shown in FIG. 7, the postural angle, $\theta$, cannot be determined directly by the angle detection value, Q. Actually, since the postural angle, $\theta$, cannot increase so much as to exceed the fixed range, it seldom happens that the measurement will be obstructed in this respect.

Figure 8A:
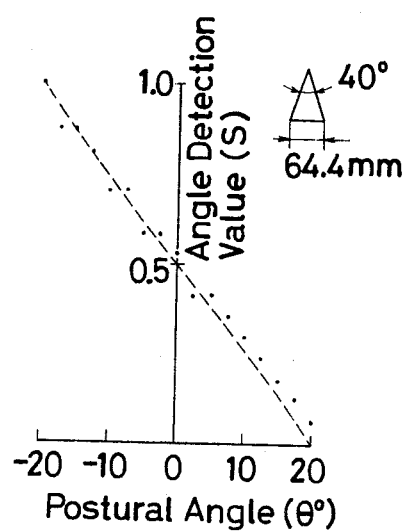
FIG. 8(A) is a graph showing the calculated values and obtained values of the postural angle of an isosceles triangle having a vertical angle of 40 degrees and a base of 64.4 mm.
Figure 8B:
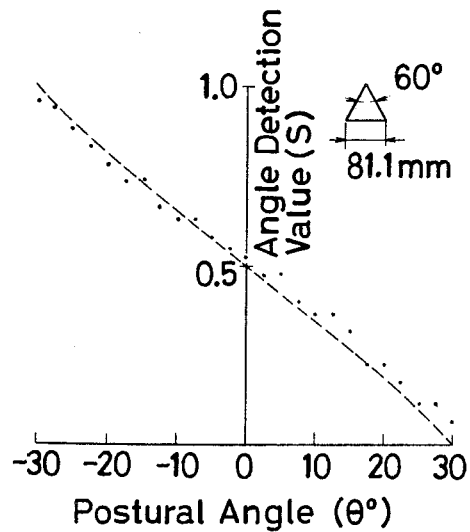
FIG. 8(B) is a graph showing the calculated values and obtained values of the postural angle of an isosceles triangle having a vertical angle of 60 degrees and a base of 81.1 mm.

FIG. 8(A) compares the measured values and calculated values of the correspondence between the angle detection value and the postural angle $\theta$ as determined of an isosceles triangle having a vertical angle of 40° and FIG. 8(B) compares those as determined similarly of an isosceles triangle having a vertical angle of 60°. A review of the graph reveals that the found values and calculated values are substantially in agreement. Particularly in the isosceles triangle having the vertical angle of 40°, the errors of measurement are negligibly small and the angle detection values indicate rectilinearity within a moderate range of postural angles. This means that this particular triangle can be advantageously utilized as a mark for the detection of the vehicle's postural angle with reference to the scheduled route of travel. In the actual measurement, the maximum angular error which can occur where the image of an isosceles triangle having a vertical angle of 40° and a base of 64.4 mm is transferred in the form of a digital image of $64 \times 48$ points is within $\pm 2.5$ degrees.

Now, the method by which the positional deviation of the vehicle is to be found from the image I photographed by the aforementioned ITV camera will be described.

Figure 9:
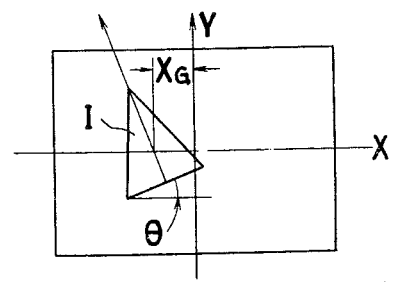
FIG. 9 is an explanatory diagram showing the travel of a vehicle along a path deviating from the scheduled route.

It is assumed that the ITV camera is installed at the center of the vehicle. When the vehicle enters the position of the mark M at a distance $X_G$ from the scheduled route of travel, the ITV camera forms an image I of the mark as shown in FIG. 9. When this mark is attached to the road surface so that its central position falls exactly on the scheduled route of the vehicle's travel, therefore, the positional deviation of the vehicle in the lateral direction relative to the scheduled route can be recognized through the measurement of the deviation $X_G$ shown in FIG. 9.

As concerns the measurement of the central position of the mark, when the pattern of that mark falls in the Cartesian coordinate system as illustrated in FIG. 3(A), the coordinates of the center of gravity ($X_G$ and $Y_G$) are represented by the following statements. Here, ds denotes the minute area of the pattern.

$$X_G = \frac{\int X \, ds}{\int ds} \quad (12)$$

$$Y_G = \frac{\int Y \, ds}{\int ds} \quad (13)$$

Here, the positional deviation $X_G$ of the vehicle will be calculated in accordance with the formula (12), with the center of the photographed image on the camera as the origin and the current direction of the vehicle's travel taken as the Y axis. The sign of the deviation $X_G$ is plus (+) when the center of the mark falls to the right of the Y axis and minus (−) when the center falls to the left of the Y axis.

Actual field experiments using several marks have yielded results which indicate that the errors in the measurement of the central positions of these marks are limited to within about 2 mm. This means that the measurement can be conducted with fairly high accuracy.

Through the measurements described above, the vehicle is capable of obtaining information on postural angles and positional deviations of its travel with reference to the marks attached to the surface of roads. The vehicle, therefore, can be accurately steered along the scheduled route by causing the steering motor thereof to be controlled so as to make necessary corrections in its travel on the basis of the information obtained as described above.

The pattern-classification value S and the surface area Aa which are required for the purpose of the recognition of the shapes and sizes of the marks and the angle detection value Q which is required for the detection of the vehicle's postural angle are all measurable through the detection of the area Aa of the shape of a given mark and the largest width Ax and the largest height Ay of the projective pattern and the width Ap between the point on the X axis at which the projective pattern has the largest height in the direction of the Y axis and the smallest value which the projective pattern has on the X axis.

Figure 10:
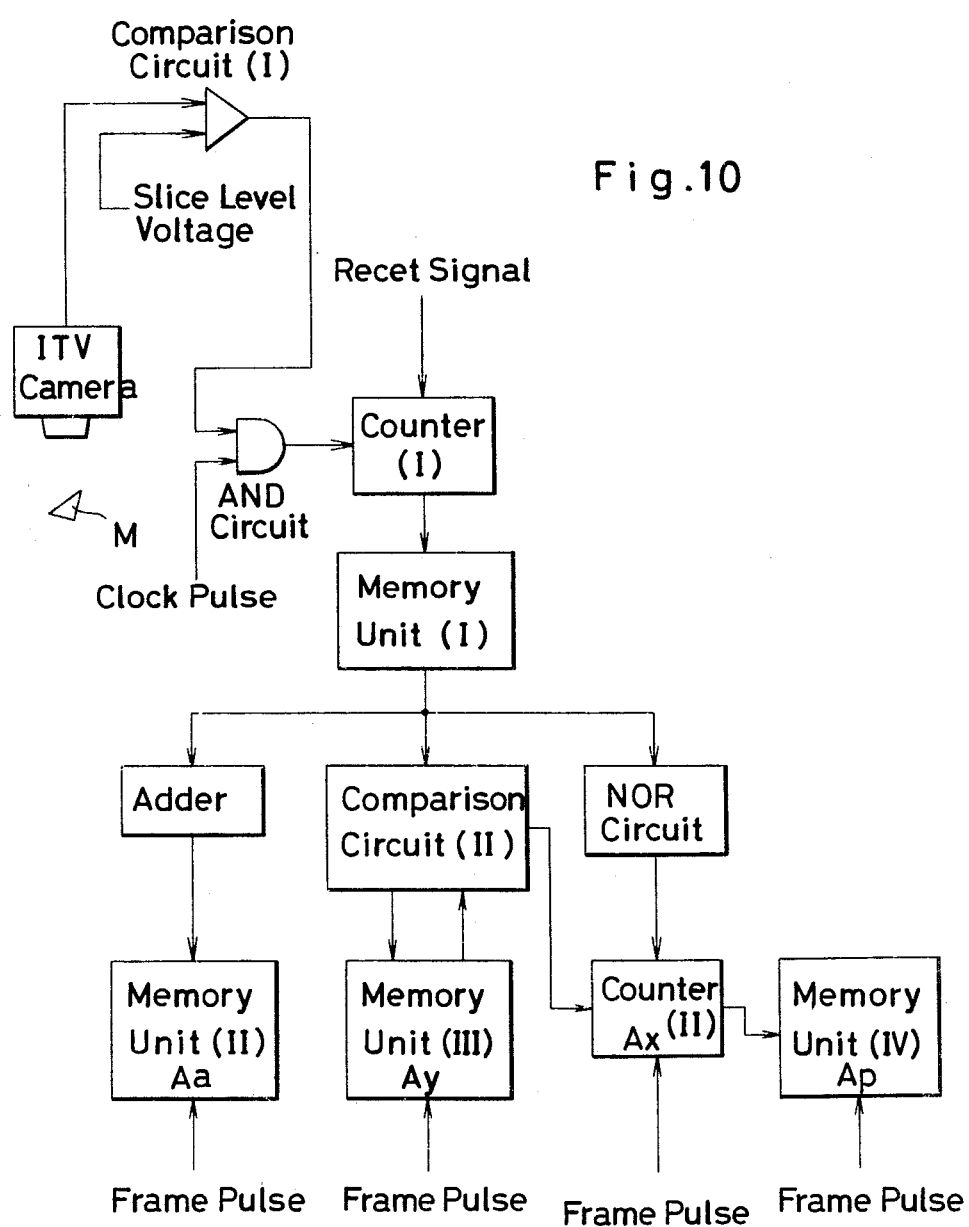
FIG. 10 is a block diagram showing one embodiment of the recognition unit to be used for the recognition of marks in the method for the automated travel of vehicles by the present invention.

A typical apparatus for effecting such detection may be of a construction as shown in FIG. 10.

In the apparatus illustrated, the ITV camera mounted on the vehicle photographs the mark M attached to the road surface. In the comparison circuit (I), the video signal consequently issued from the camera is scanned (in the direction of the Y axis) and the resultant output at each sample point is compared with the slice level voltage so that the video signal is converted into a corresponding group of binary-coded signals in conformity with the bright-dark representations of the sample points. In the AND circuit, the binary-coded signals conveyed from the comparison circuit (I) cause clock pulses to be issued to the counter (I) whenever the signal has a value "1", namely, whenever a signal indicating the presence of a pattern is detected in the sample point on the scanning lines. In the counter (I), the numbers of clock pulses for the different scanning lines are successively added up. The cumulative sums registered in the counter (I) are forwarded through the memory unit (I) to the adder, the comparison circuit (II) and the NOR circuit.

In the adder, the clock pulses from one frame of scanning lines are successively added up and the resultant sums are committed to storage in the memory unit (II). The total of the numbers of pulses produces a signal corresponding to the area Aa of the pattern.

In the comparison circuit (II), the number of pulses of one scanning line being conveyed from the memory unit (I) is compared with the number of pulses of the preceding scanning line already stored in the memory unit (III). When the number of pulses thus received is greater than that previously stored, the contents of the memory unit (III) are replaced by the number of pulses newly conveyed. In this manner, the numbers of pulses of one whole frame of scanning lines are compared to find the largest number of pulses. The largest number of pulses thus found represent the largest height Ay of the photographed image of the mark.

In the NOR circuit, a signal is issued to the counter (II) only when pulses are found in the signals of the different scanning lines conveyed from the memory unit (I). Thus, the total of pulse-containing scanning lines in a whole frame is found. The total of such scanning lines represents the largest width Ax of the photographed image of the mark.

Further in the comparison circuit (II), the number of pulses committed to storage in the memory unit (I) and that in the memory unit (III) are compared. When the comparison shows that the number of pulses in the memory unit (I) is greater, the contents of the memory unit (III) are replaced as described above and, at the same time, the contents of the counter (II) are forwarded to the memory unit (IV), causing the aforementioned width Ap to be committed to storage in the memory unit (IV).

After the area Aa of the photographed image and the largest width Ax, the largest height Ay and the width Ap of the image pattern have been determined as described above, a frame pulse is issued to reset the memory units (II), (III), and (IV) and the counter (II), readying the apparatus for the subsequent cycle of measurement.

The measurement of the center of gravitation of the mark according to the aforementioned formula (12) which is aimed at determining the positional deviation of the vehicle can easily be accomplished by any of the conventional devices. Thus, it is not described in detail here.

Figure 11:
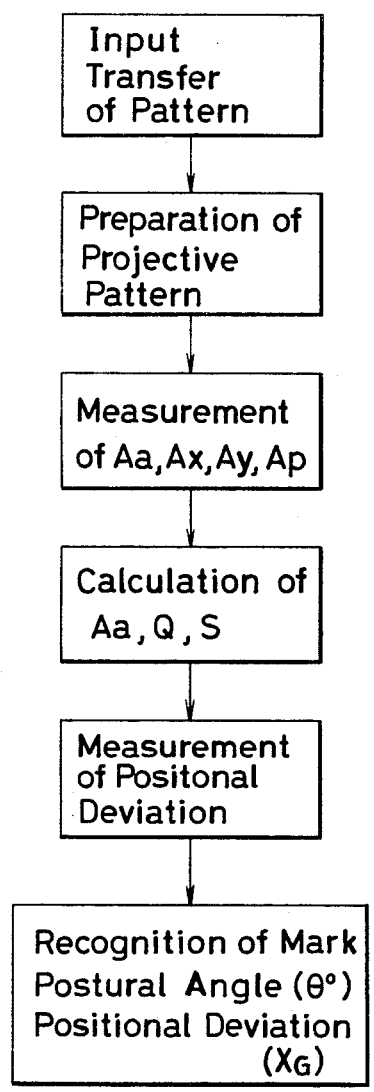
FIG. 11 is a block diagram showing a process starting with the step for input of the pattern and terminating with the step for effecting the mark recognition and the functioning of postural angle and positional deviation in the automated travel of a vehicle by the method of the present invention.

The aforementioned pattern-classification value S and the angle detection value Q can easily be calculated in accordance with the formulas (1) and (7) using the area Aa, the largest width Ax, the largest height Ay and the width Ap which have been determined by the apparatus of FIG. 10. The position of the center of the mark is also measured in accordance with the aforementioned formula (12) using any of the devices heretofore developed. Thus, the vehicle can be accurately steered along the scheduled route by having the automatic steering unit controlled so as to make necessary angular and positional corrections and eliminate angular deviations and positional deviations of the vehicle. Further, the driving and braking units of the vehicle can be controlled to have the vehicle continue or stop its travel and the automatic steering unit can be controlled to have the vehicle make a left or right turn, in accordance with the travel information resulting from the pattern-classification value and the area. Thus, the vehicle is allowed to complete its scheduled course of travel. The series of steps starting with the input transfer of the pattern and terminating with the recognition of the mark are indicated in the form of a block diagram in FIG. 11.

FIG. 12 depicts in outline the apparatus for steering the vehicle in accordance with the travel information issuing from the recognition of the mark. In the recognition unit, the mark as photographed by the ITV camera is analyzed to determine the angular deviation on the basis of the angle detection value, the positional deviation on the basis of the center of gravity and the travel information on the basis of the pattern-classification value and the area, and the information thus obtained is conveyed to the control unit. In the control unit, signals necessary for the operation of the steering wheel, accelerator and brakes are produced in accordance with the information conveyed from the recognition unit and the signals are forwarded to the steering unit, driving unit and braking unit of the vehicle to produce controlled operations of the steering unit, driving unit and braking unit respectively.

When necessary, the vehicle may be provided with a sound-pressure sensor or touch sensor, so that when the sensor detects an obstacle in the way of the vehicle, the control unit will be actuated to have the vehicle detour the obstacle or come to an emergency stop. The incorporation of such a sensor is advantageous where the present invention is applied to a wheeled chair designed for travel on an ordinary road, because the sensor serves the purpose of detecting a large noise such as from a truck and enabling the wheeled chair to seek shelter along the edge of a road, decelerate the speed of its travel or, upon contact with an obstacle standing in the way of the vehicle, bring the vehicle to an emergency stop.

For the control of the operation of the steering unit of the vehicle it readily occurs in anyone's mind that the three methods of control, i.e. the method resorting to control of steering angle, that resorting to control of the steering time and that resorting to control of both the steering angle and steering time will be effective. In any of the three methods mentioned above, the steering unit can be advantageously operated insofar as it is controlled to eliminate angular and positional deviations of the vehicle which are detected by the detection unit.

By virtue of the marks attached to the surface of roads and other similar information media, the angular information as to the vehicle's postural angles and the positional information as to the vehicle's positional deviations relative to the scheduled route of the vehicle's travel as well as the travel information as to the right and left turns of the vehicle are intermittently given to the vehicle. The control unit on the vehicle makes necessary corrections of the vehicle's travel in accordance with the intermittent inputs of the aforementioned three categories of information, enabling the vehicle to be steered accurately along the scheduled route. In the control of the steering unit of the vehicle according to the aforementioned three categories of information, the following three modes are established with respect to the operation of the steering unit. The selection of an optimum mode for the particular occasion is effected in accordance with the information received and the control of the steering unit's operation is carried out on the basis of the selected mode.

Mode 1—Steering for correction of postural angles and positional deviations:

This mode represents a method of steering operation which effects corrections of the vehicle's postural angles and positional deviations in response to the mark of No. 1. The correction of a postural angle is effected by causing the steering wheel to be turned by a certain angle, to the left or right, and retained in that position for a fixed length of time. The correction of a positional deviation is effected by causing the steering wheel to be swung by a fixed angle, to the left and right alternately, with each swing performed at a fixed speed.

Mode 2—Steering for correction of positional deviations:

This mode represents a method of steering operation which effects corrections of only the vehicle's positional deviations in response to the marks of Nos. 2, 7, 8 and 9. The correction is effected by causing the steering wheel to be swung by a fixed angle, to the left and right alternately, with each swing performed at a fixed speed.

Mode 3—Steering for left or right turn of the vehicle:

This mode represents a method of steering operation which effects a change in the direction of the vehicle's travel in response to the marks of Nos. 3 and 4. The change of the direction is effected by causing the steering wheel to be turned to the left or right by the largest steering angle for a fixed length of time.

Typical paths followed by an experimental vehicle when guidance of the vehicle's travel was automated by Mode 1, Mode 2 and Mode 3 were as shown in FIG. 13, FIG. 14 and FIG. 15 respectively. The vehicle used in the experiment had a wheelbase of 0.65 m and was operated at a speed of 15 m/min.

Figure 16:
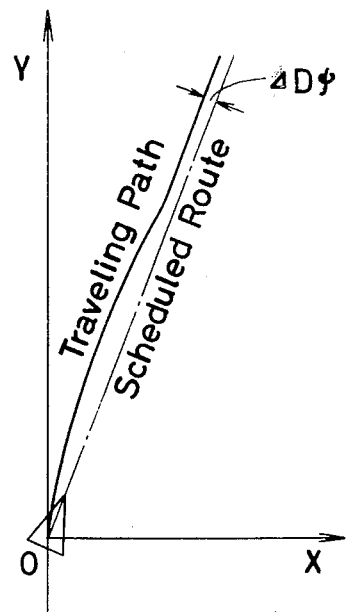
FIG. 16 is an explanatory diagram showing the nature of the offset angle involved in the correction of the postural angle of a vehicle in the automatic guidance system for vehicles of this invention.

Generally, in the automatic guidance of a vehicle along a scheduled route of roads by means of the marks as described above, when the steering unit of the vehicle is controlled to effect a correction in the direction of travel, the resultant correction of the direction is inevitably entailed by an offset $\Delta D\phi$ relative to the scheduled route of travel as illustrated in FIG. 16. The vehicle cannot be steered accurately along the scheduled route unless this offset is suitably absorbed. Mode 1 is the particular steering method which is aimed primarily at a correction of such nature. Specifically as shown in FIG. 13(A), where corrections are required in both postural angle and positional deviation, the steering unit is controlled in the first step to make necessary correction of the postural angle $\theta$ of the vehicle and in the second step to effect necessary correction of the aforementioned offset $\Delta D\phi$ and the positional deviation $X_G$. When the vehicle at a given time involves a postural angle $\theta$ of 15° to the right and a positional deviation of 20 cm to the right of the scheduled route of travel as shown in FIG. 13(A), the steering wheel is turned to the left by an angle of 19.02° for a period of 2.6 seconds to effect necessary correction in the postural angle. Then the steering wheel is swung by a fixed angle of 27.74°, to the left and right alternately, with each swing carried out at a uniform speed of 2.6 seconds for the purpose of making necessary correction in the positional deviation. After the vehicle has advanced for about two meters in this manner, it will come to travel accurately along the scheduled route.

Mode 2 is applied where the vehicle's travel requires corrections only in the positional deviations as shown in FIG. 14(B). Similarly to the steering in the second step of the operation of Mode 1, the steering wheel is swung by an angle corresponding to the positional deviation, to the left and right alternately, for a fixed length of time. If, in this case, there initially exists any deviation in the postural angle, this angular deviation remains after completion of the controlled operation of the steering unit described above. When there occurs a positional deviation of 0.1 m as shown in FIG. 14(A), the steering wheel is turned to the left by an angle of 10.1° for a period of 2.6 seconds and then turned to the right by the same angle for the same period. After 1.3 m of travel, the vehicle comes to travel accurately along the scheduled route.

Mode 3 is the method of steering which causes the vehicle to make a lefthand turn or righthand turn of its travel. This is accomplished by keeping the steering wheel turned to the indicated direction by the largest steering angle for a fixed length of time. The length of time involved in this case is not necessarily equal to the time required for the control of the steering unit for the aforementioned Mode 1 or Mode 2. This fixed time is such as to be sufficient for the vehicle to complete its required left or right turn. When the mark "left turn" is detected, the steering wheel is turned by 45° to the left and kept in this direction for a period of 6.5 seconds. Consequently, at the end of the stated period, the vehicle completes a left turn by describing a path as shown in FIG. 15(A).

Through combinations of the modes of operation described above, the vehicle can be caused to travel accurately along the stated route. Since Mode 2 involves a control system for causing the steering wheel to be swung in the positive and negative directions alternately for a fixed length of time and Mode 3 a control system for causing the steering wheel to be turned in one given direction for a given length of time, suitable combinations of these modes permit the vehicle to enjoy a perfectly automated guidance along a given route.

Now, the method for controlling the operation of the steering unit in accordance with the aforementioned modes will be described.

As described above with reference to the block diagram of FIG. 11, the pattern of the image of the mark photographed on the ITV camera permits recognition of the kind of the mark, the angular deviation and the positional deviation of the vehicle's travel. Thus, the control circuit in the apparatus for the vehicle's steering operation illustrated in FIG. 12 is given a configuration represented by the block diagram of FIG. 17.

In the diagram of FIG. 17, the mode setting circuit serves the purpose of deciding among the aforementioned three modes of operation in conformity with the kind of the mark which has been recognized on the basis of the aforementioned pattern-classification value, the measured area, etc. When the mark so recognized happens to be that of the triangle No. 1 shown in FIG. 2, for example, the mode setting circuit makes a decision that the steering operation will be made in Mode 1 and issues a command to that effect to the steering pattern generation unit.

In the meantime, in the sign determining circuits (I) and (II) to which the inputs representing the angular deviation and the positional deviation are given, the positive/negative signs of the angular deviation and positional deviation are detected to decide between the left and right turns of the steering wheel. The results of this detection and both the deviations are forwarded to the steering pattern generation unit.

The steering pattern generation unit is provided with circuits for generating steering patterns one each for the aforementioned three modes of operation, Modes 1 through 3. It serves the purpose of selecting the mode generation circuit designated by the mode setting circuit and determines the turning direction of the steering wheel in accordance with the sign conveyed from the sign determining circuits (I) and (II) and, at the same time, determines the steering angle on the basis of the angular deviation and the positional deviation. When these signals are conveyed to the steering unit and the drive-controlling unit, the automatic guidance of the vehicle's travel is accomplished through designated combinations of modes. When the mode to be designated by the mode setting circuit happens to be Mode 3, the steering wheel of the vehicle is kept at its maximum steering angle for a fixed length of time without reference to the presence or absence of the angular deviation and positional deviation.

Where the control mode is determined through the recognition of the mark and the steering of the vehicle is effected in accordance with the control mode determined as described above, the configuration of the control unit will be notably simplified.

This invention permits a vehicle loaded with articles to be automatically guided in its travel to a given destination through successive recognition of the marks attached to the surface of roads along the scheduled route. Unlike the conventional belt conveyor system, the system of this invention enjoys freedom in the change of routes for the automatic guidance of vehicle travel. Besides, the change of routes is accomplished simply by changing positions for the attachment of the marks. This system possesses a great advantage that the roads selected as the routes for the automatic guidance of vehicle travel can be utilized by pedestrians as well. And the system is relatively simple in terms of structure.

What is claimed is:

1. An automatic guidance system for a vehicle provided with an automatic steering unit, comprising:
   marks of various shape patterns respectively characteristic of specific travel-function information attached to the surface of a route selected for the travel of the vehicle;
   an ITV camera mounted on the vehicle and adapted to photograph successively said marks;
   means for recognizing the shapes, postural angles and positional deviations of the marks photographed by the ITV camera, comprising,
   means for measuring the largest height $A_y$ in the direction of the Y axis of the pattern of the mark photographed by the ITV camera and projected on the X axis in a cartesian coordinate system,
   means for measuring the width $A_p$ from the point of intersection between the X axis and a perpendicular line drawn from the point of the largest height of the projected pattern to the X axis to the point on the X axis at which the projected pattern has the smallest value,
   means for measuring the largest width $A_x$ of the projected pattern in the direction of the X axis, and
   means for measuring the ratio between the width $A_p$ and the largest width $A_x$; and
   means for conveying a signal corresponding to the ratio obtained to the automatic steering unit for thereby adjusting the postural angle of the vehicle so as to have the vehicle steered accurately along said route.

2. The system according to claim 1, wherein said recognizing means, comprises:
   means for measuring the point on the X axis of the center of the projected pattern, and
   means for comparing the point obtained with the center of the mark photographed by the ITV camera,
   wherein the signal obtained by the comparison is conveyed to the automatic steering unit thereby to adjust the positional deviation of the vehicle so as to have the vehicle steered accurately along said route.

3. The system according to claim 1, wherein said recognizing means comprises:
   means for measuring the area of the projected pattern,
   means for measuring the product of the largest height $A_y$ multiplied by the largest width $A_x$, and
   means for measuring the ratio between the area and the product, wherein the travel-function information characteristic of said mark is recognized on the basis of the ratio between said area and said product.

4. The system according to claim 2, wherein said recognizing means comprises:
   means for measuring the area of the projected pattern,
   means for measuring the product of the largest height $A_y$ multiplied by the largest width $A_x$, and
   means for measuring the ratio between the area and the product, wherein the travel-function information characteristic of said mark is recognized on the basis of the ratio between said area and said product.

5. The system according to claim 4, further comprising:
   means for conveying the recognized travel-function information to the automatic steering unit such that the vehicle is steered on the basis of the signal for adjusting the postural angle, the signal for adjusting the positional deviation and the signal of the travel-function information.

6. The system according to claim 5, further comprising:
   memory means for storing three modes of steering operation consisting of Mode 1 which causes the steering wheel to be turned by a required steering angle, to the left or right, for a fixed length of time for the correction of postural angle and also causes the steering wheel to be swung by a required steering angle, to the left and right alternately, for a fixed length of time, Mode 2 which causes the steering wheel to be swung by a required steering angle, to the left and right alternately, for a fixed length of time for the purpose of correcting only the positional deviation and Mode 3 which causes the steering wheel to be turned by the maximum steering angle, to the left or right, for a fixed length of time for the purpose of producing a left or right turn of the vehicle's travel; and means for selecting the optimum mode of steering on the basis of the conveyed signals for adjusting the postural angle, for adjusting the positional deviation and on the basis of the travel-function information, and for conveying the selected optimum mode of steering to the automatic steering unit.

7. The system according to claim 5, wherein the selecting means selects an optimum mode of steering stored in the memory means on the basis of the conveyed signal of travel-function information of the marks.

* * * * *